(12) United States Patent
Ritter

(10) Patent No.: US 7,247,809 B2
(45) Date of Patent: Jul. 24, 2007

(54) WELDING MACHINE FOR THE PRODUCTION OF WIRE GRID SHEET

(75) Inventor: Klaus Ritter, Graz (AT)

(73) Assignee: EVG Entwicklungs- u. Verwertungs-Gesellschaft m.b.H., Raaba (AT)

( * ) Notice: Subject to any disclaimer, the term of this patent is extended or adjusted under 35 U.S.C. 154(b) by 78 days.

(21) Appl. No.: 10/558,785

(22) PCT Filed: Mar. 22, 2005

(86) PCT No.: PCT/AT2005/000103

§ 371 (c)(1),
(2), (4) Date: Nov. 29, 2005

(87) PCT Pub. No.: WO2005/092555

PCT Pub. Date: Oct. 6, 2005

(65) Prior Publication Data

US 2007/0007252 A1    Jan. 11, 2007

(30) Foreign Application Priority Data

Mar. 25, 2004  (AT) ............................... A 533/2004

(51) Int. Cl.
  *B23K 11/00*  (2006.01)
  *B21F 27/10*  (2006.01)
(52) U.S. Cl. ......................... 219/56.1; 219/79
(58) Field of Classification Search ............... 219/56.1, 219/79, 78.01

See application file for complete search history.

(56) References Cited

U.S. PATENT DOCUMENTS

| 3,588,417 | A | * | 6/1971 | Gott et al. | ..................... 219/56 |
| 3,676,632 | A | * | 7/1972 | Ritter et al. | ................... 219/58 |
| 4,940,874 | A | * | 7/1990 | Ritter et al. | ................... 219/87 |
| 6,241,142 | B1 |  | 6/2001 | Chou et al. | |

FOREIGN PATENT DOCUMENTS

| AT | 396 210 B | 7/1993 |
| DE | 296 14 518 U1 | 10/1996 |

\* cited by examiner

*Primary Examiner*—Len Tran
(74) *Attorney, Agent, or Firm*—Cohen Pontani Lieberman & Pavane LLP

(57) ABSTRACT

A welding machine, operating by the electric resistance welding method, for producing wire grid mat of longitudinal and transverse wires (L, Q) crossing one another and welded together at the crossing points, having a plurality of welding units (1, 1'), located transversely to the production direction, which at least for each longitudinal wire have one upper welding head (2) with an upper electrode, located above the grid production plane (X-X), and one lower welding head (5) along with a lower electrode movable counter to the upper electrode, the lower welding head being located below the grid production plane (X-X), having a common rail system (26, 28, 31) with at least two common rails extending along the welding line (S-S), for delivering the welding current to the welding electrodes, in which for continuously variable positioning of all the welding units transversely to the production direction (P1) along the welding line, adjusting devices (56, 57) and clamping devices (64, 65, 66; 64', 65', 66') as well as drive mechanisms (60, 60', 60''; 61, 62, 63) are provided.

20 Claims, 3 Drawing Sheets

WELDING MACHINE FOR THE PRODUCTION OF WIRE GRID SHEET

RELATED APPLICATION

This is a U.S. national stage of application No. PCT/AT2005/000103, filed on 25 Mar. 2005.

FIELD OF THE INVENTION

The invention relates to a welding machine, operating by the electric resistance welding method, for producing wire grid mat of longitudinal and transverse wires crossing one another and welded together at the crossing points, having a plurality of welding units, located transversely to the production direction, which at least for each longitudinal wire have one upper welding head with an upper electrode, located above the grid production plane), and one lower welding head along with a lower electrode movable counter to the upper electrode, the lower welding head being located below the grid production plane, having a common rail system with at least two common rails extending along the welding line, for delivering the welding current to the welding electrodes, the common rails being electrically connectable to the two poles of at least one welding transformer, and having a conveying direction, which can be coupled to the welding electrodes for displacing and positioning the welding electrodes transversely to the production direction.

BACKGROUND OF THE INVENTION

From Austrian Patent Disclosure AT-B 396210, a welding machine of this generic type for producing wire grid mats comprising longitudinal and transverse wires crossing one another and welded together at the crossing points is known. The welding machine has a connecting piece, which penetrates the grid production plane and is solidly connected to the upper electrode and forms the electrical connection of the lower electrode to the welding transformer. For positioning the electrodes transversely to the production direction, the lower electrode is docked to the upper electrode, and the lower electrode is additionally connected to the connecting piece, creating a rigid welding head. Simultaneously with the connection of the electrodes to form a rigid welding head, this welding head is detached from the common rails. The welding head is coupled to the conveying direction and then moved transversely to the production direction. This welding machine has the disadvantage that the grid production plane is penetrated by the connecting pieces, and positioning of the electrodes can therefore be done only once all the longitudinal wires have been removed from the range of motion of the electrodes.

Also from Austrian Patent Disclosure AT-B 332198, a device for delivering the welding current to welding electrodes in a multi-point grid welding machine that has at least two common rails extending across the machine width transversely to the production direction is known. This device has an adjustable switch member that depending on its switching position connects one of the common rails at a time selectively to the lower electrodes. A disadvantage of this device is the fact that because the common rails extend over the machine width, the welding current paths are of different lengths for different longitudinal wire diameters.

SUMMARY OF THE INVENTION

One object of the invention is to overcome the above-described disadvantages of the known devices and to create a device of the type described at the outset that makes it possible to position the welding units of the welding machine continuously variably at each arbitrary point along the welding line, and to achieve the shortest and most uniform possible welding current paths, distributed over the welding line.

It is also an object of the invention to be able to perform fast positioning of the welding electrodes, without hindrance from the longitudinal wires, at any arbitrary position along the welding line, and in the process to make the smallest possible spacings of the longitudinal wires possible, that is, the smallest possible pitch of the longitudinal wires in the wire grid mat to be produced.

These and other objects are attained according to one aspect of the invention in that each upper welding head, with the aid of a connecting device, can be firmly clamped to a stationary beam extending parallel to the welding line above the grid production plane, and each lower welding head, with the aid of a further connecting device, can be firmly clamped to a stationary beam extending parallel to the welding line below the grid production plane; that for continuously variable positioning of all the welding units transversely to the production direction along the welding line of the welding machine, the upper welding head of each welding unit can be docked to an adjusting device, located above the grid production plane and movable parallel to the welding line, with the aid of a clamping device, and the lower welding head of the same welding unit can simultaneously be docked to an adjusting device, located below the grid production plane and movable parallel to the welding line, with the aid of a further clamping device, and the two welding heads are detachable from their associated beams. The adjusting devices, with the aid of a drive mechanism are movable in common and simultaneously parallel to the welding line. The common rail system has one common rail each extending above and below the grid production plane parallel to the welding line and extending over the machine width, and the upper electrodes and the lower electrodes are detachably connectable to the common rails. The common rail of at least one pole has at least two common rails located parallel to one another and electrically insulated, and at least one common rail comprises at least two segments, located one after the other along the welding line and electrically insulated, and the insulators between the segments of different common rails are offset from one another. Each segment is connectable to the pole of at least one welding transformer. For alternating connection of a welding electrode to the multiple common rails, a displaceable switchover device is provided.

The adjusting device for the upper welding head can have an upper adjusting carriage, movable along at least one guide rail located in stationary fashion on the upper beam, and the adjusting device for the lower welding head can have a lower adjusting carriage, movable along at least one guide rail, located in stationary fashion on the lower beam, and both adjusting carriages, for simultaneous adjustment in common along the welding line, are solidly connected to the drive mechanism.

In a further embodiment of the invention, the drive mechanism for both adjusting carriages has an endless toothed belt, guided over a plurality of deflection wheels, which is drivable in both directions via a drive wheel with the aid of a drive motor, and the upper adjusting carriage for the upper welding head is in communication with an upper run of the toothed belt that extends above the grid production plane, parallel to the welding line, and the lower adjusting carriage is in communication with a lower run of the toothed belt that extends below the grid production plane, parallel to the welding line.

Alternatively, the drive mechanism for both adjusting carriages has two adjusting spindles, extending parallel to the welding line and drivable, preferably in coupled fashion, in both directions, one spindle being located above the grid production plane and communicating with the upper adjusting car, and the other spindle being located below the grid production plane (and communicating with the lower adjusting car.

DETAILED DESCRIPTION OF THE DRAWINGS

Figure 1:
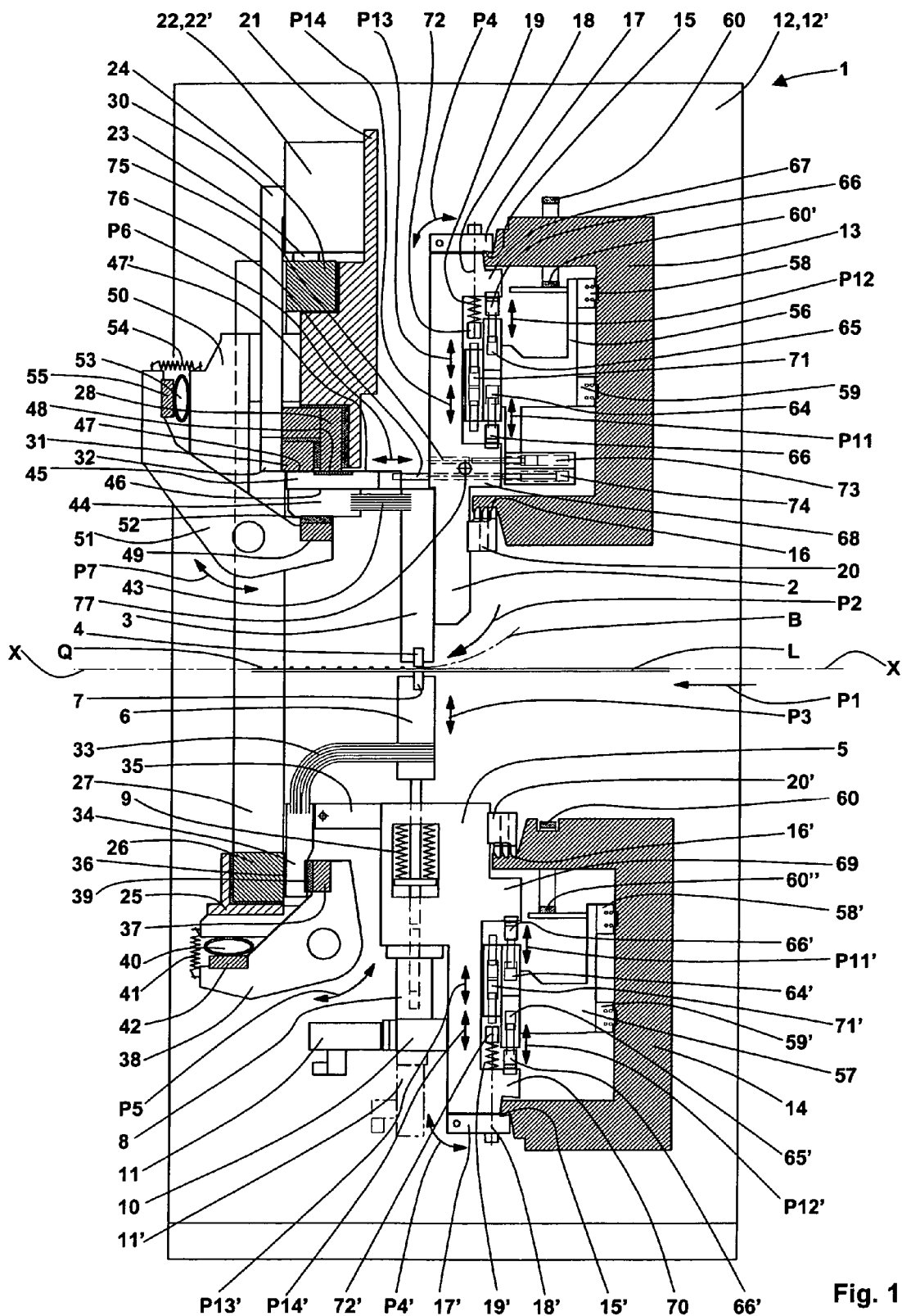
FIG. 1 shows a schematic side view of a welding unit of a welding machine according to an embodiment of the invention.

FIGS. 1, 2 and 3a through 3c schematically show a welding unit 1 of a welding machine that serves to produce wire grid mats which comprise longitudinal wires L and transverse wires Q crossing one another and welded together at the crossing points. The longitudinal wires L are introduced, with the aid of delivery devices, in a horizontal plane in the production direction P1 with mutual lateral spacing, that is, the so-called longitudinal wire pitch, parallel into the welding machine, where they are welded at the crossing points to the transverse wires Q. The transverse wires Q are introduced into the welding machine in the direction of the arrow P2 with the aid of a delivery device along a delivery path B. The longitudinal wires L and transverse wires Q define a grid production plane X-X, which is located at the crossing points of the longitudinal wires and transverse wires.

The welding machine has a plurality of welding units 1, 1' (FIG. 2), located side by side; the number of welding units 1, 1' should preferably correspond to the number of longitudinal wires delivered. Each welding unit 1, 1' has one upper welding head 2, which is located vertically above the grid production plane X-X and which on its lower end, toward the grid production plane X-X, carries an upper electrode holder 3. An upper electrode 4 is inserted into the upper electrode holder 3, and the upper electrodes 4 of all the welding units 1, 1', with their ends oriented toward the longitudinal wires L, define a welding line S-S extending transversely to the production direction P1.

Each welding unit 1, 1' has one lower welding head 5, located vertically below the grid production plane X-X, which on its end toward the longitudinal wires L carries a lower electrode holder 6. A lower electrode 7 is inserted into the lower electrode holder 6 and cooperates with the corresponding upper electrode 4 during the welding of the wire grid mat. The lower electrode holder 6 is movable in the directions indicated by the double arrow P3 counter to the upper electrode 4 with the aid of a welding cylinder 8 and can be restored to its outset position with the aid of at least one restoring spring 9. In the exemplary embodiment shown, the welding cylinder 8 is a hydraulic cylinder. Mounted on the bottom of the hydraulic cylinder 8 is a distributor block 10, to one side of which hoses for supplying hydraulic oil are connected and to the other side of which a switching valve 11 for switching the hydraulic cylinder 8 is screwed.

Figure 2:
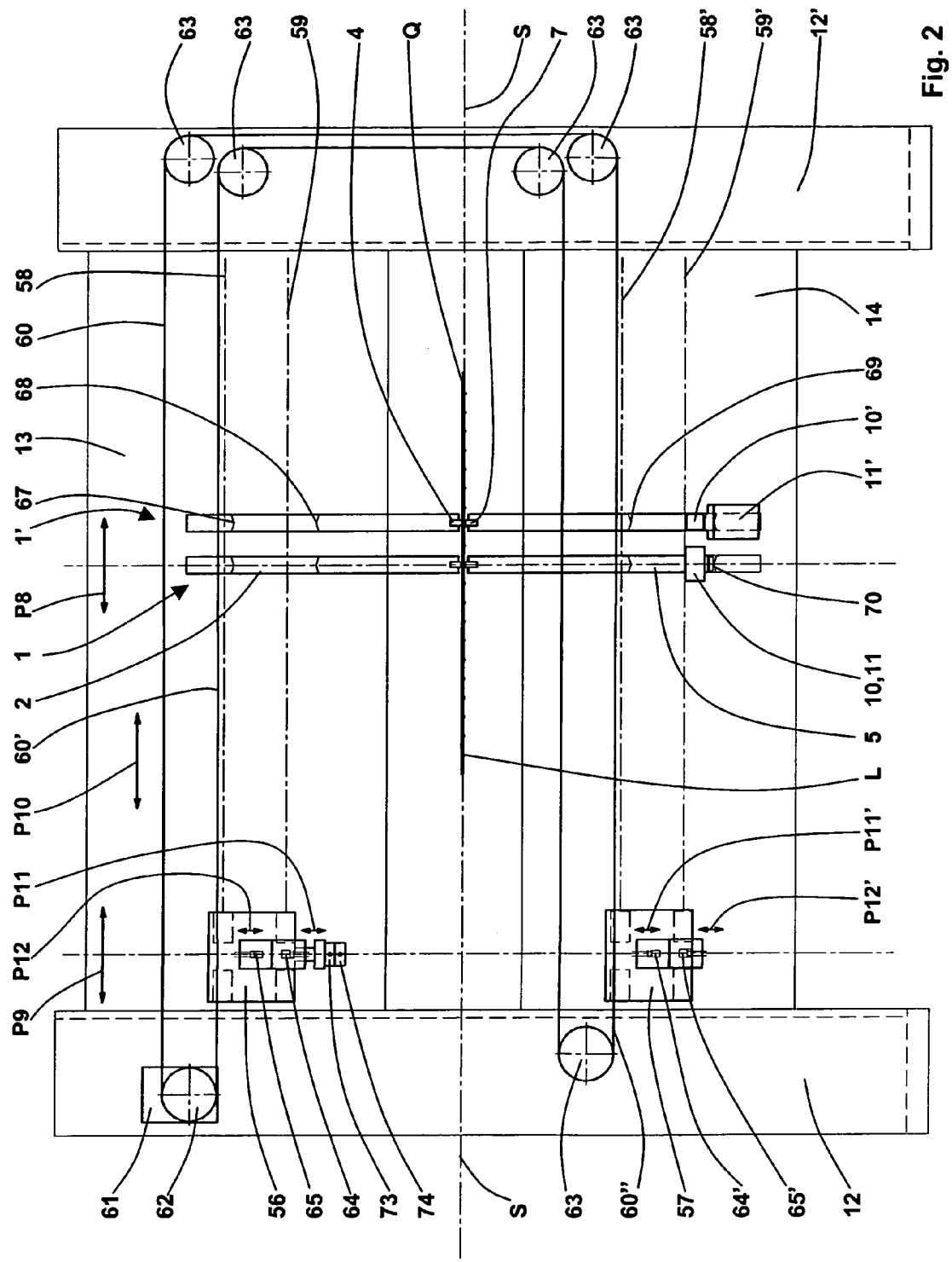
FIG. 2 shows a schematic top view of the adjusting device for the welding units.

To make it possible to produce wire grid mats that have the smallest possible spacings between longitudinal wires L, that is, the smallest possible longitudinal wire pitch, for instance of 25 mm, the upper and lower welding heads 2, 5 of the welding units 1, 1' are embodied as slenderly as possible parallel to the welding line S-S. Since the valve block 10 and the switching valve 11, in most cases, are wider than the width of the associated welding unit 1, 1', the valve blocks 10 and the switching valves 11 of adjacent welding units 1, 1' must be offset in internested fashion to one another. This is achieved by locating the valve blocks 10 and 10' (FIG. 2) and the switching valves 11 and 11' of adjacent welding units 1, 1' offset by 90° from another, as schematically indicated in FIGS. 1 and 2.

When the diameters of the transverse wires Q within the wire grid mat to be welded are equal, it is possible to press against longitudinal wires L of various diameters with the biased lower electrodes 7. By means of a suitable switching of the switching valve 11, 11', it is furthermore possible within the scope of the invention to subject each hydraulic cylinder 8 to a different working pressure, so that the contact pressures exerted by the lower electrodes 7 on different diameters of the longitudinal wires L and transverse wires Q within the wire grid mat to be welded are adaptable.

The welding machine has two vertical machine stands 12, 12', located outside the grid production plane X-X, which are connected by means of an upper, U-shaped connecting beam 13, extending parallel to the welding line S-S and located above the grid production plane X-X, and a lower, U-shaped connecting beam 14, likewise extending parallel to the welding line S-S and located below the grid production plane X-X; the two connecting beams 13, 14 are located on the entrance side of the welding line S-S, and the opening in the connecting beams 13, 14 that is enclosed by the two legs is open toward the welding line S-S. The upper connecting beam 13 has a clamping ledge 15 on its upper leg end, extending parallel to the welding line S-S, whose clamping face is facing away from the grid production plane X-X, and on its lower leg end it has a plurality of positioning ledges 16, extending parallel to one another and to the welding line S-S, which are oriented toward the grid production plane X-X. The lower connecting beam 14, on its upper leg end, has a plurality of positioning ledges 16' extending parallel to one another and to the welding line S-S, and on its lower leg end it has a clamping ledge 15'; each of the clamping ledges 15 and 15' have the same shape and the same locations of their working faces relative to the grid production plane X-X, and likewise each of the positioning ledges 16 and 16' relative to each other. The positioning ledges 16, 16' have a plurality of chamfered positioning faces, offset from one another, which extend parallel to the welding line S-S. Within the scope of the invention, the positioning faces of the positioning ledges 16, 16' may also be roof-shaped.

The upper welding head 2, on its upper end, has a clamping lever 17, which is pivotable in the directions indicated by the double arrow P4, and which firmly clamps the upper welding head 2 to the clamping ledge 15 of the upper connecting beam 13. The clamping lever 17 is clamped via a thrust rod 18 by a spring assembly 19. The lower welding head 5, on its lower end, has a clamping lever

17', which is pivotable in the directions P4' and which firmly clamps the lower welding head 5 to the clamping ledge 15' of the lower connecting beam 14. The clamping lever 17' is clamped via a thrust rod 18' by a spring assembly 19'.

The upper welding head 2, on its lower end, has a guide piece 20, with a positioning face that extends parallel to the welding line S-S and positively engages the corresponding positioning face of the positioning ledges 16 of the connecting beam 13. The lower welding head 5, on its upper end, has a guide piece 20', with a positioning face that extends parallel to the welding line S-S and positively engages the corresponding positioning face of the positioning ledges 16' of the connecting beam 14. The positioning faces of the guide pieces 20, 20' receive the welding pressure and should therefore be designed accordingly; in particular, a sufficiently large bearing surface area and a sufficiently long bearing length are required. To make a small longitudinal wire pitch in the wire grid to be produced possible, however, the welding heads 2, 5 must be embodied as slenderly as possible in the direction of the welding line S-S. To achieve this, and in particular at the same time to have a sufficiently long bearing length, the positioning faces of the guide pieces 20, 20' of adjacent welding heads 2, 5 are offset from one another as viewed in the production direction P1. In FIG. 1, the positioning faces of three adjacent welding units are shown as examples.

On an upper beam 21, which extends above the grid production plane X-X transversely to the production direction P1 and is secured to the two machine stands 12, 12', two groups each of four welding transformers 22 and 22', respectively (FIGS. 3a, 3b, 3c), are located in stationary fashion. Within the scope of the invention, it is possible to select both a different number of groups and a different number of welding transformers per group; the particular number depends on the type of welding machine and on the welding machine program. One pole of the welding transformers 22, 22' is solidly joined, with the aid of current connection pieces 23, 23' (FIGS. 3a, 3b, 3c), to an upper common rail 24 which extends parallel to the welding line S-S and extends over the entire width of the welding machine and which is secured in insulated fashion to the upper beam 21. A one-piece lower common rail 26 is secured in insulated fashion to a lower beam 25, which extends below the grid production plane X-X transversely to the production direction P1 and is secured to the machine stands 12, 12'; this lower common rail extends parallel to the welding line S-S and extends over the full width of the welding machine. The upper and lower common rails 24, 26 are joined by two connecting pieces 27, 27' (FIGS. 3a, 3b, 3c) that extend vertically outside the grid production plane X-X.

A front common rail 28, extending parallel to the welding line S-S, is secured in insulated fashion to the upper beam 21; this front common rail 28 extends over the full width of the welding machine and comprises four segments 28a, 28b, 28c, and 28d (FIG. 2), which are electrically separated from one another by insulator pieces 29. Each front common rail piece 28a, 28b, 28c, 28d is connected to the other pole of a welding transformer 22 via a respective connection bracket 30. A rear common rail 31, extending parallel to the welding line S-S, is also secured in insulated fashion to the upper beam 21; this rear common rail 31 extends over the full width of the welding machine and comprises four segments 31a, 31b, 31c, and 31d (FIG. 2), which are electrically separated from one another by insulator pieces 29'. Each front common rail piece 31a, 31b, 31c, 31d is connected to the other pole of a welding transformer 22' via a respective further connection bracket 32. The rear common rails 31a, 31b, 31c, 31d are also electrically insulated from the front common rail pieces 28a, 28b, 28c, 28d.

The electrical connection of the lower common rail 26 to the lower electrode holder 6 and thus to the lower electrode 7 of all the welding units 1, 1' is effected via a flexible lower current strip 33, which is secured to the lower electrode holder 6 and whose lower end a lower connection piece 34 is located. The lower connection piece 34 is secured movably to a lateral suspender 35 of the lower welding head 5. The lower connection piece 34 has a contact face 36, which can be pressed against the lower common rail 26. With the aid of a lower pressure strip 37, extending parallel to the welding line S-S, the lower connection piece 34 is pressed with its contact face 36 against the lower common rail 26; the pressure strip 37 can be pressed against the lower connection piece 34 and detached from it by a plurality of lower pivot levers 38 which are pivotable in the directions of the double arrow P5 and are secured to the supporting arm of the lower beam 25. The lower pressure strip 37 has an elastic layer 39, by which tolerance errors between the pressure strip 37 and the lower connection pieces 34 are compensated for. The pivoting motion of the lower pivot levers 38 in the directions of the double arrow P5 is executed by means of a lower pressure hose 40, which can be subjected to a pressure medium and extends parallel to the welding line S-S, and the restoring motion can be executed by tension springs 41 secured to the pivot levers 38 and to the lower beam 25. The lower pressure hose 40 is braced on one end on a pressure strip 42 that extends parallel to the welding line S-S and is joined to the pivot levers 38 and on the other is braced on the lower beam 25.

The electrical connection of the front and rear common rail pieces 28a, 28b, 28c, 28d; 31a, 31b, 31c, 31d to the upper electrode holder 3 and thus to the upper electrode 4 of all the welding units 1, 1' is effected via a flexible upper current strip 43, which is secured to the upper electrode holder 3 and on whose lower end an upper connection piece 44 is located. Connected between the upper connection piece 44 and the front and rear common rail pieces 28a, 28b, 28c, 28d; 31a, 31b, 31c, 31d, is a pole slide 45, which can be positioned in the directions of the double arrow P6 in two working positions, and which has a lower contact face 46 with the upper connection piece 44 and has two upper contact faces 47 and 47'; depending on the working position, by means of the upper contact faces 47, 47', an electrical connection of the pole slide 45 to the front common rail pieces 28a, 28b, 28c, 28d or the rear common rail pieces 31a, 31b, 31c, 31d is made, respectively. An insulation face 48 is placed between the two contact faces 47 and 47' to prevent wrong contact with the common rails 28, 31.

With the aid of an upper pressure strip 49, extending parallel to the welding line S-S, the upper connection piece 44 can be pressed against the lower contact face 46 of the pole slide 45, and thus, depending on the position of the pole slide 45, against the front or rear common rail 28 or 31. The upper pressure strip 49 can be pressed against the upper connection piece 44 and detached from it with the aid of a plurality of upper pivot levers 51, secured pivotably in the directions of the double arrow P7 to a lever holder 50 connected to the upper beam 21. The upper pressure strip 49 has an elastic layer 52, by which tolerance errors between the pressure strip 49 and the upper connection pieces 44 are compensated for. The pivoting motion of the upper pivot levers 51 in the directions of the double arrow P7 is executed by an upper pressure hose 53, extending parallel to the welding line S-S, that can be subjected to a pressure medium, and the restoring motion is executed by tension springs 54 secured to the upper pivot levers 51 and to the lever holder 50. The upper pressure hose 53 is braced on one end against a pressure strip 55, extending parallel to the welding line S-S and joined to the upper pivot levers 51, and on the other on the lever holder 50.

For continuously variable adjustment of the welding units 1, 1' transversely to the production direction P1 along the welding line S-S in the directions of the double arrow P8 (FIG. 2), an upper adjusting carriage 56 in the upper connecting beam 13, that is, in the exemplary embodiment shown in the opening in the connecting beam 13, and a lower adjusting carriage 57 in the lower connecting beam 14, that is, in the exemplary embodiment shown in the opening in the connecting beam 14, are located movably in the directions of the double arrow P9 (FIG. 2), each along the welding line S-S, on upper guide rails 58, 58' and lower guide rails 59, 59'. For the adjustment, the upper and lower adjusting carriages 56, 57 are simultaneously connected to an endless toothed belt 60, which is driven in the directions of the double arrow P10 via a drive wheel 62 driven by a drive motor 61; the toothed belt 60 is guided over a plurality of deflection wheels 63 (FIG. 2). The toothed belt 60 is guided through the welding machine such that with only one toothed belt 60, both the upper and the lower adjusting carriages 56, 57 can be positioned in common and simultaneously; the upper adjusting carriage 56 is connected to a run 60' of the toothed belt 60, located above the grid production plane X-X and extending parallel to the welding line S-S, and the lower adjusting carriage 57 is connected to a run 60'' of the toothed belt 60 located below the grid production plane X-X and extending parallel to the welding line S-S. By means of the simultaneous fastening to the corresponding runs 60', 60'' of the toothed belt 60, both adjusting carriages 56, 57 are moved in common, each in the same direction P9 and at the same speed.

Two clamping cylinders 64 and 65 are secured to the adjusting carriage 56 of the upper welding head 2; their piston rods are located in a line perpendicular to the grid production plane X-X, and they are movable perpendicular to the grid production plane X-X in the directions indicated by the double arrows P11 and P12, respectively. The clamping cylinder 64 located closest to the guide piece 20 of the upper welding head 2 has an effective cross section that is greater than the effective cross section of the other clamping cylinder 65. The differences in effective cross sections must in every case be selected such that by means of the actuation of the clamping cylinders 64, 65; 64', 65', on the one hand the guide pieces 20, 20' are detached from the respective associated positioning ledges 16, 16' far enough that unhindered displacement of the welding units 1, 1' are made possible, and on the other hand, it is assured that the pole slide 45 as well as the associated connection piece 44 will lift from the corresponding common rails 28, 31. One clamping piece 66 each is mounted on the piston rods of the clamping cylinders 64, 65 and is embodied as V-shaped on its free end. The clamping piece 66 of the clamping cylinder 65 engages an upper receptacle 67, embodied in a roof-shape at the engagement point, of the upper welding head 2. The clamping piece 66 of the clamping cylinder 64 engages a lower receptacle 68, also embodied as roof-shaped at the engagement point, of the upper welding head 2.

Two clamping cylinders 64' and 65' are secured to the adjusting carriage 57 of the lower welding head 5; their piston rods are located in a line perpendicular to the grid production plane X-X, and they are movable perpendicular to the grid production plane X-X in the directions of the double arrows P11' and P12', respectively. The clamping cylinder 64' located closest to the guide piece 20' of the lower welding head 5 has an effective cross section that is greater than the effective cross section of the other clamping cylinder 65'. One clamping piece 66' each is mounted on the piston rods of the clamping cylinders 64', 65' and is embodied as V-shaped on its free end. The clamping piece 66' of the clamping cylinder 65' engages an upper receptacle 69, embodied in a roof-shape at the engagement point, of the lower welding head 5. The clamping piece 66' of the clamping cylinder 65' engages a lower receptacle 70, also embodied as roof-shaped at the engagement point, of the lower welding head 5.

In the welding position, the upper welding head 2 is pressed against the clamping ledge 15 by the clamping lever 17 and thus fixed, while the lower welding head 5 is pressed the clamping ledge 15' by the clamping lever 17' and thus fixed. For adjusting a welding unit 1, 1' to a new welding position along the welding line S-S in the directions of the double arrow P8, the upper adjusting carriage 56 and the lower adjusting carriage 57 are moved in common and simultaneously in the welding unit 1, 1' to be adjusted, so that on the one hand, the clamping piece 66 of the large clamping cylinder 64 of the upper adjusting carriage 56 is now located precisely above the lower receptacle 68 in the upper welding head 2, and the clamping piece 66 of the small clamping cylinder 65 of the upper adjusting carriage 56 is now located precisely below the upper receptacle 67 in the upper welding head 2, and on the other hand, the clamping piece 66' of the large clamping cylinder 64' of the lower adjusting carriage 57 is now located precisely below the upper receptacle 69 in the lower welding head 5, and the clamping piece 66' of the small clamping cylinder 65' of the lower adjusting carriage 57 is located precisely above the lower receptacle 70 in the lower welding head 5.

Next, the pivot levers 38 and 51 are pivoted in the corresponding directions of the double arrows P4, P5, so that the upper connection piece 44 and the pole slide 45 come free of the common rails 28 and 31, respectively, and the lower connection piece 34 comes free of the lower common rail 26. By ensuing simultaneous actuation of the clamping cylinders 64, 64' in the directions of the double arrows P11, P11' oriented toward the grid production plane X-X and of the clamping cylinders 65, 65' in the corresponding opposite directions of the double arrows P12, P12', oriented away from the grid production plane X-X, the piston rods move outward, and as a result the clamping pieces 66, 66' are docked with the corresponding upper and lower receptacles 67, 68; 69, 70 of the welding heads 2, 5, and then by the further motion of the piston rods, a positive and nonpositive connection of the upper welding head 2 to the upper adjusting carriage 56 and simultaneously a positive and nonpositive connection of the lower welding head 5 to the lower adjusting carriage 57 are effected.

The clamping cylinders 64, 65; 64', 65' are further subjected to pressure, so that because of the different effective cross sections of the clamping cylinders 64, 65; 64', 65', a resultant further motion occurs in the direction of the larger clamping cylinders 64, 64' and thus toward the grid production plane X-X, as a result of which the upper welding head 2 is lifted from the positioning ledge 16 of the upper connecting beam 13, and the lower welding head 5 is lifted from the positioning strip 16' of the lower connecting beam 14. One air cylinder 71 and 71' each is secured to the upper adjusting carriage 56 and to the lower adjusting carriage 57, respectively, with two contrarily acting piston rods, which upon activation are movable in the corresponding directions of the respective double arrows P13, P14 and P13', P14' in accordance with what they are subjected to.

For detaching the upper and lower welding heads 2, 5 from their associated connecting beams 13, 14, the air cylinders 71, 71' are actuated simultaneously with the clamping cylinders 64, 65; 64', 65'. Upon actuation of the air cylinders 71, 71', the two piston rods of each move apart, whereupon the piston rods facing away from the grid production plane X-X press against a thrust pad 72, 72', which is located on the respective thrust rods 18, 18'. As a result of this motion, the clamping action of the spring assemblies 19, 19' is undone, so that the upper and lower welding heads 2, 5 come free of the respective clamping ledges 15, 15' of the connecting beams 13, 14. Because of the bidirectional embodiment of the air cylinders 71, 71', no tilting moment is introduced into the respective welding heads 2, 5, so that these continue to hang vertically, without tilting.

For actuation of the pole slide 45, the upper welding head 2, in the region of its lower receptacle 68, has two work cylinders 73 and 74, which are actuatable in the directions of the double arrow P6. The piston rods of the work cylinders 73, 74 each act on a respective rack 75, 76, which each mesh with a respective gear wheel 77, located between them in the upper welding head 2; one rack 76 is solidly joined to the pole slide 45. While the adjustment of the welding units 1, 1' along the welding line S-S is taking place, the switchover of the polarization of the desired common rails 28, 31 is effected, if needed, onto the upper connection piece 44. For the polarization onto the rear common rail 31, the lower work cylinder 74 is first, as shown in FIG. 1, retracted to its outset position, and the upper work cylinder 73 is extended. For polarization onto the front common rail 28, the work cylinders 73, 74 are connected in the reverse order.

After the positioning of the welding units 1, 1 has been done, the work cylinders 73, 74 of the pole slide positioning unit withdraw to their outset position. By actuation of the air cylinders 71, 71' in the corresponding directions of the double arrows P13, P14; P13', P14', respectively, the spring assemblies 19, 19' are tensed, so that by means of the clamping levers 17, 17', pivoting in the corresponding directions of the double arrows P4, P4', the welding heads 2, 5 are firmly clamped in the clamping ledges 15, 15' of the corresponding connecting beams 13, 14. Next, the clamping cylinders 64, 65; 64', 65' on the adjusting carriages 56, 57 are simultaneously actuated in the opposite direction, so that the welding heads 2, 5 are seated with the positioning faces of their receptacles 67, 68; 69, 70 in the positioning faces of the positioning ledges 16, 16' of the corresponding connecting beams 13, 14. Finally, by pivoting of the pivot levers 38, 51 in the corresponding directions of the double arrows P5, P7, the connection pieces 34 are pressed against the lower common rail 26, and the connection pieces 44 are pressed with the pole slides 45 against the front or rear common rail 28 or 31, as applicable, in order to establish the electrical connection of the poles of the welding transformers 22, 22' to the upper and lower electrodes 4, 7.

Once the adjustment of the welding units 1, 1' has been completed, the adjusting carriages 56, 57, as shown in FIG. 2, move in the corresponding direction of the double arrow P9 back into a position so far toward the end of the welding line S-S that they do not hinder the delivery of the transverse wires Q or the welding of the wire grid mat.

Figure 3A:
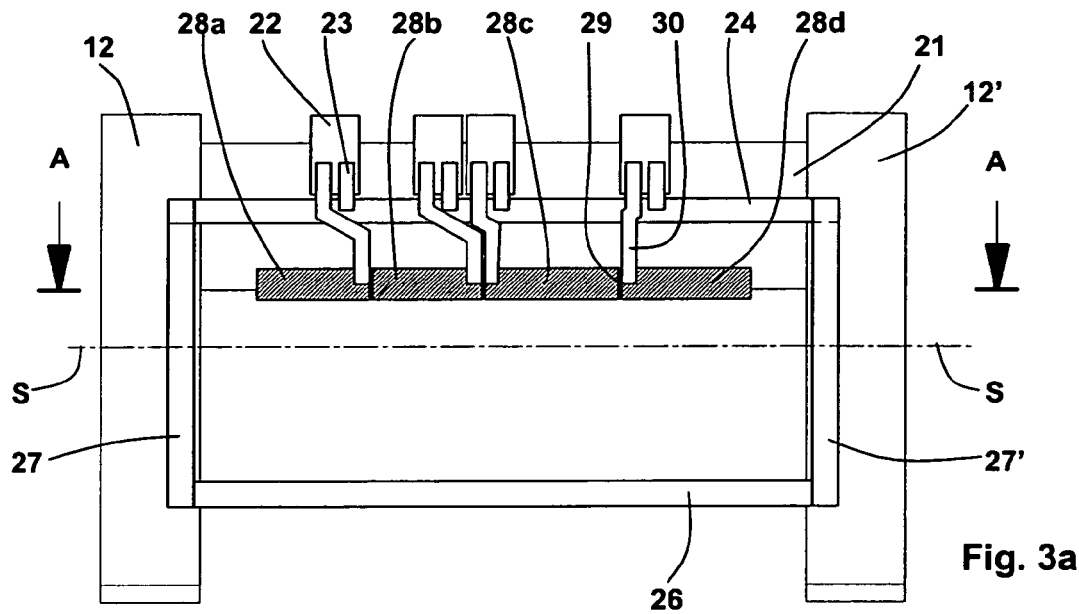
FIG. 3a shows a schematic view of the feeding of welding current into the front common rails.
Figure 3B:
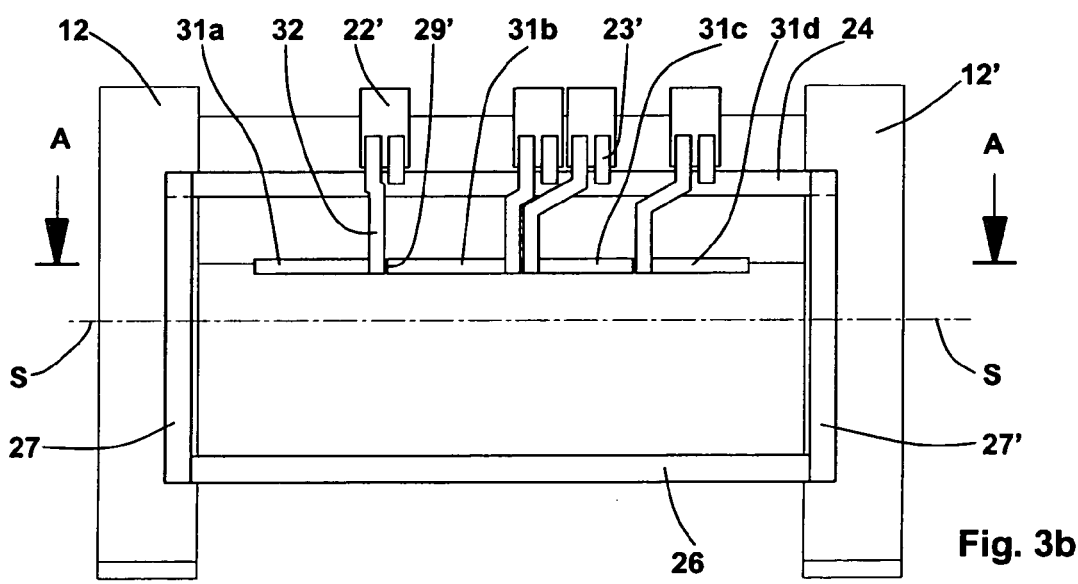
FIG. 3b shows a schematic view of the feeding of the welding current into the rear common rails.
Figure 3C:
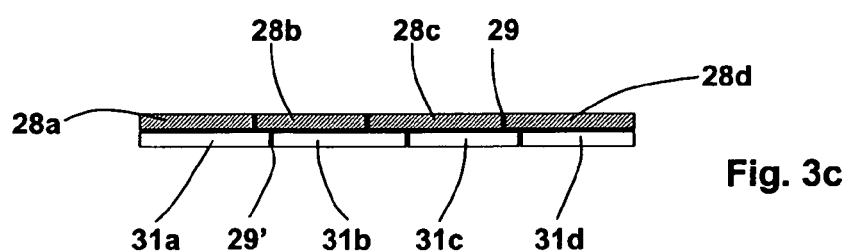
FIG. 3c shows a schematic section through the front and rear common rails, as indicated by the section arrows A-A in FIGS. 3a and 3b.

In FIGS. 3a, 3b and 3c, the current connections are shown schematically.

The individual segments 31a, 31b, 31c, 31d of the common rail 31 are offset from the segments 28a, 28b, 28c, 28d of the common rail 28 such that all the gaps, necessary because of the insulators 29, 29' between the segments 28a, 28b, 28c, 28d; 31a, 31b, 31c, 31d are spanned by the segments of a different common rail. Because of this arrangement, over the full welding width of the welding machine along the welding line S-S, there is no position in which the welding units 1, 1' cannot be associated with one of the welding transformers 22, 22'. The distribution of the common rails 28, 31 over a plurality of segments and the disposition of the connection brackets 30, 32 as close as possible to the middle of the welding machine and the return of the welding current via the common rails 24, 26, 27, 27' furthermore have the advantage that current paths of virtually equal length are assured for all positions of the welding units 1, 1' along the welding line S-S. Because of the embodiment according to the invention of the common rails 24, 26; 28, 31, it is possible to make a more uniform distribution of the welding units 1, 1' among the various welding transformers 22, 22'. It is furthermore possible to assign different settings of welding parameters to the individual welding units 1, 1', as is necessary for instance for welding wires of different diameters within one wire grid mat. By feeding the welding current into the welding units 1, 1' via a plurality of groups of welding transformers 22, 22' and by distributing the common rails 28, 31 among a plurality of segments, as well as because of the possibility of fast reversal of polarization of the various common rails 28, 31 individually in each welding unit 1, 1' during the adjustment of the welding units 1, 1', a far greater variation in welding parameters, and thus the production of a larger number of types of wire grid mats than in known welding machines are possible.

Within the scope of the invention, however, it is also possible for only one of the common rails to be divided up into segments, while the other common rail must extend at least over the gaps dictated by the insulation of the segments. It is furthermore possible within the scope of the invention to use only a single welding transformer, whose pole can be connected to the various common rails.

The welding machine has a control device, which as a function of the welding program optimizes the positioning of the welding units 1, 1' and the correspondingly required polarization of the common rails 28a, 28b, 28c, 28d; 31a, 31b, 31c, 31d with respect to the welding parameters and the repositioning times and which outputs the appropriate control commands.

It is understood that the exemplary embodiment shown can be modified in various ways within the scope of the general concept of the invention, in particular with regard to the design of the drive for adjusting the adjusting carriages of the welding heads. Instead of an endlessly revolving driven toothed belt, it is possible within the scope of the invention to provide one spindle drive per adjusting car, this spindle drive being coupled, outside the welding line, to a common drive, for instance via a belt. The drives may be designed differently, but according to the concept of the invention they must make a simultaneous, continuously variable adjustment in common of the upper and lower welding heads 2, 5 of a welding unit 1, 1' possible, and no mechanical connection must be allowed to penetrate the grid production plane X-X.

It is furthermore possible within the scope of the invention to put welding units not needed for welding the wire grid mats in a parking position outside the welding line, with the aid of the adjusting carriages 56, 57.

The invention claimed:

1. A welding machine, operating by the electric resistance welding method, for producing wire grid mat of longitudinal and transverse wires (L, Q) crossing one another and welded together at the crossing points, having a plurality of welding units (1, 1'), located transversely to the production direction, which at least for each longitudinal wire have one upper welding head (2) with an upper electrode, located above the grid production plane (X-X), and one lower welding head (5) along with a lower electrode movable counter to the upper electrode, the lower welding head being located below the grid production plane (X-X), having a common rail system (26, 28, 31) with at least two common rails extending along the welding line (S-S), for delivering the welding current to the welding electrodes, the common rails being electrically connectable to the two poles of at least one welding transformer (22, 22'), and having a conveying direction, which can be coupled to the welding electrodes (4, 7) for displacing and positioning the welding electrodes transversely to the production direction, characterized in that each upper welding head (2), with the aid of a connecting device (17, 18, 19, 20), can be firmly clamped to a stationary beam (13) extending parallel to the welding line (S-S) above the grid production plane (X-X), and each lower welding head (5), with the aid of a further connecting device (17', 18', 19', 20'), can be firmly clamped to a stationary beam (14) extending parallel to the welding line (S-S) below the grid production plane (X-X); that for continuously variable positioning of all the welding units (1, 1') transversely to the production direction (P1) along the welding line (S-S) of the welding machine, the upper welding head (2) of each welding unit (1, 1') can be docked to an adjusting device (56), located above the grid production plane (X-X) and movable in a direction (P9) parallel to the welding line (S-S), with the aid of a clamping device (64, 65, 66), and the lower welding head (5) of the same welding unit (1, 1') can simultaneously be docked to an adjusting device (57), located below the grid production plane (X-X) and movable (P9) parallel to the welding line (S-S), with the aid of a further clamping device (64', 65', 66'), and the two welding heads (2, 5) are detachable from their associated beams (13, 14); that the adjusting devices (56, 57), with the aid of a drive mechanism (60, 60', 60", 61, 62, 63) are movable (P9) in common and simultaneously parallel to the welding line (S-S); that the common rail system has one common rail (26, 28, 31) each extending above and below the grid production plane (X-X) parallel to the welding line (S-S) and extending over the machine width, and the upper electrodes (4) and the lower electrodes (7) are detachably connectable to the common rails (26; 28, 28a, 28b, 28c, 28d; 31, 31a, 31b, 31c, 31d); that the common rail of at least one pole has at least two common rails (28, 31) located parallel to one another and electrically insulated, and at least one common rail (28, 31) comprises at least two segments (28a, 28b, 28c, 28d; 31a, 31b, 31c, 31d), located one after the other along the welding line (S-S) and electrically insulated (29, 29'), and the insulators (29, 29') between the segments (28a, 28b, 28c, 28d; 31a, 31b, 31c, 31d) of different common rails (28, 31) are offset from one another; that each segment (28a, 28b, 28c, 28d; 31a, 31b, 31c, 31d) is connectable to the pole of at least one welding transformer (22, 22'); and that for alternating connection of a welding electrode (4, 7) to the multiple common rails (28, 31), a displaceable (P6) switchover device (45) is provided.

2. The welding machine in accordance with claim 1, characterized in that the adjusting device (56) for the upper welding head (2) has an upper adjusting device (56), movable (P9) along at least one guide rail (58, 59) located in stationary fashion on the upper beam (13), and the adjusting device (57) for the lower welding head (5) has a lower adjusting device (57), movable (P9) along at least one guide rail (58', 59'), located in stationary fashion on the lower beam (14), and both adjusting carriages (56, 57), for simultaneous adjustment (P9) in common along the welding line (S-S), are solidly connected to the drive mechanism (60, 60', 60"; 61, 62, 63).

3. The welding machine in accordance with claim 1, characterized in that the drive mechanism for both adjusting carriages (56, 57) has an endless toothed belt (60), guided over a plurality of deflection wheels (63), which is drivable in both directions (P10) via a drive wheel (62) with the aid of a drive motor (61), and the upper adjusting carriage (56) for the upper welding head (2) is in communication with a run (60') of the toothed belt (60) that extends above the grid production plane (X-X), parallel to the welding line (S-S), and the lower adjusting carriage (57) is in communication with a run (60") of the toothed belt (60) that extends below the grid production plane (X-X), parallel to the welding line (S-S).

4. The welding machine in accordance with claim 1, characterized in that the drive mechanism for both adjusting carriages (56, 57) has two adjusting spindles, extending parallel to the welding line (S-S) and drivable, preferably in coupled fashion, in both directions (P10), one spindle being located above the grid production plane (X-X) and communicating with the upper adjusting carriage (56), and the other spindle being located below the grid production plane (X-X) and communicating with the lower adjusting carriage (57).

5. The welding machine in accordance with claim 1, characterized in that one pole of the welding transformers (22, 22') is connected to a one-piece common rail (26).

6. The welding machine in accordance with claim 1, characterized in that one pole of each of the welding transformers (22, 22') is connected by fixed connections (23, 23'; 24, 27, 27') to the one-piece common rail (26), and the other pole is connected to the multi-part common rails (28, 31) by further fixed connection brackets (30, 32).

7. The welding machine in accordance with claim 1, characterized in that in the case of a plurality of welding transformers (22, 22'), the welding transformers are connectable to one another in groups, and the same poles of one group (22) of welding transformers are connected electrically to one multi-part common rail (28, 28a, 28b, 28c, 28d), and the same poles of another group (22') are connected electrically to another common rail (31, 31a, 31b, 31c, 31d).

8. The welding machine in accordance with claim 1, characterized in that for firmly clamping the welding heads (2, 5) to their associated beams (13, 14), each welding heads (2, 5) has one, preferably pivotable (P13, P13') clamping lever (17, 17') that can be clamped to the associated beam (13, 14) and has one guide piece (20, 20'), and the clamping levers (17, 17'), with the aid of a fixation device (18, 19; 18', 19'), are clamped by positive and nonpositive engagement to clamping ledges (15, 15'), extending parallel to the welding line (S-S), of the respective beams (13, 14), and the guide pieces (20, 20') have positioning faces, which positively and nonpositively engage correspondingly shaped positioning ledges (16, 16'), extending parallel to the welding line (S-S), of the respective beams (13, 14).

9. The welding machine in accordance with claim 1, characterized in that the clamping devices, for docking the upper welding head (2) to the upper adjusting device (56) and the lower welding head (5) to the lower adjusting device (57), each have two operating cylinders (64, 65; 64', 65'), located on the respective adjusting device (56, 57), and all the operating cylinders (64, 65; 64', 65') are triggerable in common and simultaneously in the corresponding directions of motion (P11, P12; P11', P12'), extending perpendicular to the grid production plane (X-X), and the piston rods of all the operating cylinders (64, 65; 64', 65') each carry one clamping piece (66, 66') on their free end, which clamping piece is connectable by positive and nonpositive engagement to correspondingly shaped receptacles (67, 68; 69, 70) in the upper welding head (2) and the lower welding head (5), respectively.

10. The welding machine in accordance with claim 9, characterized in that for detaching the welding heads (2, 5) from their associated beams (13,14), the operating cylinders (64, 65; 64', 65') have different effective cross sections.

11. The welding machine in accordance with claim 1, characterized in that for detaching the respective clamping lever (17, 17'), one air cylinder (71, 71') each is located on the respective adjusting carriage (56, 57) and with its piston rod detaches the respective fixation device (18, 19; 18', 19').

12. The welding machine in accordance with claim 1, characterized in that each fixation device, for clamping the respective welding heads (2, 5) to the respective beams (13, 14), has one spring element (19, 19'), cooperating with a thrust rod (18, 18'); and that for detaching the respective welding heads (2, 5) from the respective beams (13, 14), the piston rods of the air cylinders (71, 71') compress the spring element (19, 19'), via a thrust pad (72, 72').

13. The welding machine in accordance with claim 1, characterized in that the lower welding head (5) has a movable connection piece (34), which for connection to the lower common rail (26), with the aid of a plurality of pivotable (P5) pivot levers (38), preferably distributed uniformly over the machine width, is electrically connectable to these pivot levers; and that the upper welding head (2) has a movable connection piece (44), which for selective connection to the upper common rails (28, 31), with the aid of a plurality of pivotable (P7) pivot levers (51), preferably distributed uniformly over the machine width, is electrically connectable to these pivot levers.

14. The welding machine in accordance with claim 13, characterized in that for actuating each of the pivot levers (38, 51), one pressure hose (41, 53) each, extending over the machine width and capable of being placed on one end against the corresponding pivot levers (38, 51) and on the other against a stationary stop (25, 50), can be acted upon by pressure; and that for restoring each of the pivot levers (38, 51), preferably one restoring spring (41, 54) each is provided.

15. The welding machine in accordance with claim 1, characterized in that the reversal of polarization of the common rails (28a, 28b, 28c, 28d; 31a, 31b, 31c, 31d) to the corresponding welding electrodes (4, 7) is effected by the switchover device (45) during the positioning of the welding units (1, 1').

16. The welding machine in accordance with claim 1, characterized in that the switchover device is embodied as an elongated pole slide (45), which on the one hand is electrically connectable to the associated connection piece (44) via a contact face (46) and on the other has at least two contact faces (47, 47'), electrically insulated by an insulation face or faces (48), and only one contact face (47, 47') at a time is electrically connectable to the common rails (28, 31).

17. The welding machine in accordance with claim 16, characterized in that for displacing the pole slide (45), two alternatingly connected (P6) work cylinders (73, 74), located on the corresponding adjusting carriage (56), are provided, which in alternation actuate two racks (75, 76), meshing with an intervening gear wheel (77), one rack (76) being solidly connected to the pole slide.

18. The welding machine in accordance with claim 1, characterized in that for moving (P3) the lower electrode (7) in the direction of the upper electrode (4), a welding cylinder (8) with a valve block (10, 10') and a switching valve (11, 11') are provided, and the valve blocks (10, 10') and switching valves (11, 11') of adjacent welding heads (1, 1') are located in internested fashion, offset from one another, for attaining a short width of the welding heads (2, 5) parallel to the welding line (S-S).

19. The welding machine in accordance with claim 1, characterized in that for attaining a short width of the welding heads (2, 5) parallel to the welding line (S-S), the positioning faces of the positioning ledges (16, 16') on the beams (13, 14), viewed in the production direction (P1), are located in nested fashion and offset from one another; and that the associated positioning faces of the guide pieces (20, 20') of adjacent welding heads (1, 1'), likewise viewed in the production direction (P1), extend offset from one another.

20. The welding machine in accordance with claim 1, characterized in that a control unit is provided, which as a function of the welding program optimizes the positioning of the welding units (1, 1') and the correspondingly required polarization of the common rails (28a, 28b, 28c, 28d; 31a, 31b, 31c, 31d) with regard to the welding parameters and the repositioning times and issues the appropriate control commands.

* * * * *